(12) United States Patent
Horn et al.

(10) Patent No.: US 12,356,376 B2
(45) Date of Patent: Jul. 8, 2025

(54) SLOT PRECONFIGURATION FOR COVERAGE ENHANCEMENT AND POWER SAVING

(71) Applicant: QUALCOMM Incorporated, San Diego, CA (US)

(72) Inventors: Idan Michael Horn, Hod Hasharon (IL); Shay Landis, Hod Hasharon (IL); Amit Bar-Or Tillinger, Tel-Aviv (IL); Yehonatan Dallal, Kfar Saba (IL); Daniel Paz, Geva Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/950,020

(22) Filed: Sep. 21, 2022

(65) Prior Publication Data

US 2024/0098711 A1    Mar. 21, 2024

(51) Int. Cl.
*H04W 72/0446* (2023.01)
*H04W 56/00* (2009.01)
*H04W 72/23* (2023.01)

(52) U.S. Cl.
CPC ..... *H04W 72/0446* (2013.01); *H04W 56/001* (2013.01); *H04W 72/23* (2023.01)

(58) Field of Classification Search
CPC .......... H04W 72/0446; H04W 56/001; H04W 72/23
See application file for complete search history.

(56) References Cited

U.S. PATENT DOCUMENTS 10,813,137 B2 *  10/2020  Shih ..................... H04W 16/32
2022/0085931 A1 *  3/2022  Mondal ............... H04W 72/044

* cited by examiner

Primary Examiner — Kyaw Z Soe
(74) Attorney, Agent, or Firm — Guang Y. Zhang; Patterson & Sheridan LLP

(57) ABSTRACT

Certain aspects of the present disclosure provide techniques for slot preconfiguration for coverage enhancement and power saving. An example method performed by a UE includes processing one or more synchronization signals in a first slot according to a first configuration of slot parameters, wherein the synchronization signals are used for at least one of time or frequency tracking, receiving, from a network entity, a second configuration of slot parameters, and processing a physical downlink control channel (PDCCH) in a second slot according to the second configuration of slot parameters, wherein the second slot occurs within a configured slot duration that is offset in time from the first slot.

30 Claims, 12 Drawing Sheets

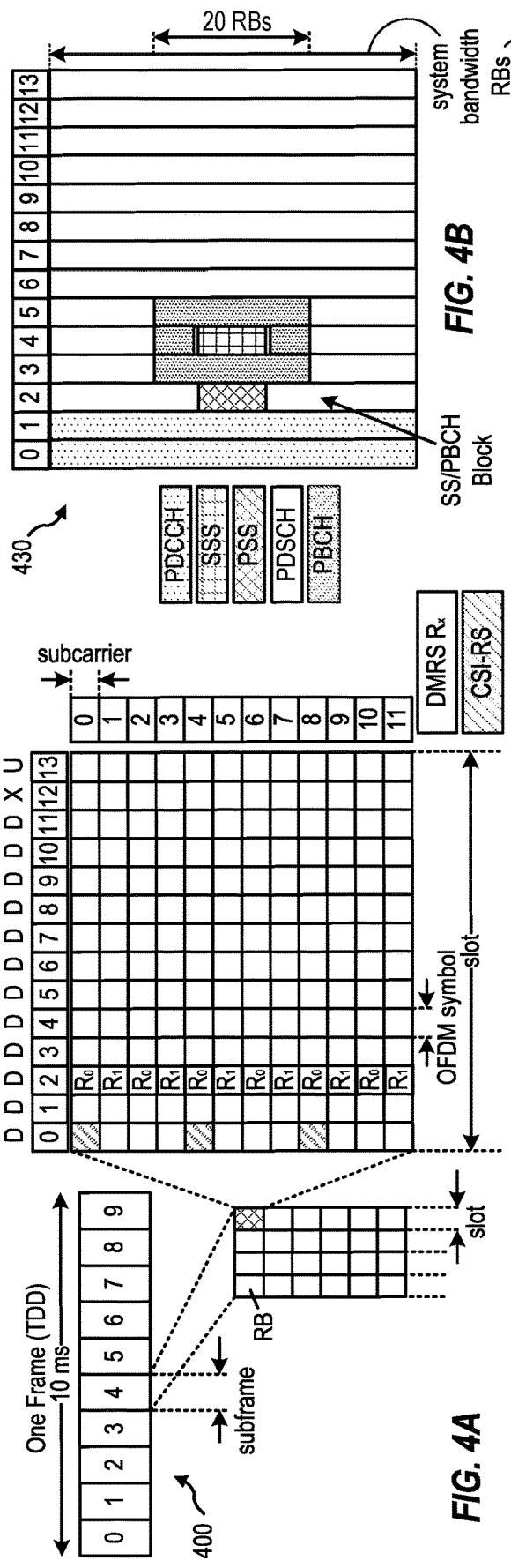
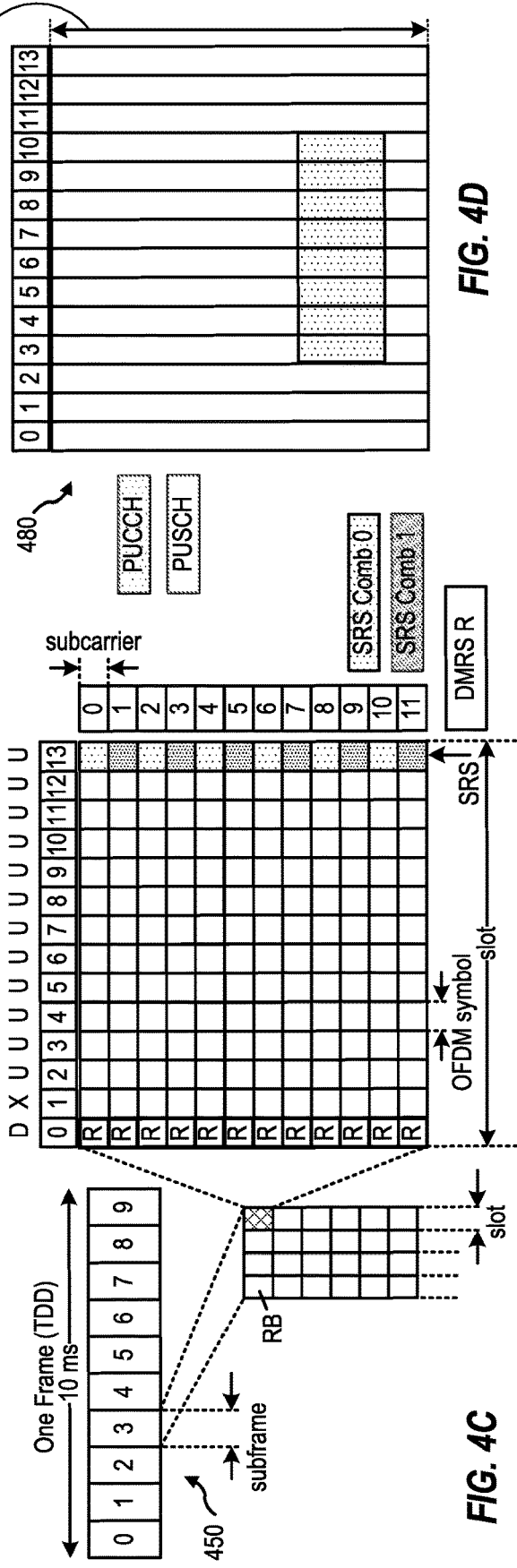

SLOT PRECONFIGURATION FOR COVERAGE ENHANCEMENT AND POWER SAVING

BACKGROUND

Field of the Disclosure

Aspects of the present disclosure relate to wireless communications, and more particularly, to techniques for slot preconfiguration for coverage enhancement and power saving.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes receiving processing one or more synchronization signals in a first slot according to a first configuration of slot parameters, wherein the synchronization signals are used for at least one of time or frequency tracking; receiving, from a network entity, a second configuration of slot parameters; and processing a physical downlink control channel (PDCCH) in a second slot according to the second configuration of slot parameters, wherein the second slot occurs within a configured slot duration that is offset in time from the first slot.

Another aspect provides a method for wireless communications by a network entity. The method includes transmitting one or more synchronization signals in a first slot according to a first configuration of slot parameters, wherein the synchronization signals are used for at least one of time or frequency tracking; transmitting a second configuration of slot parameters; and transmitting a PDCCH, for a UE, in a second slot according to the second configuration of slot parameters, wherein the second slot occurs within a configured slot duration that is offset in time from the first slot.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
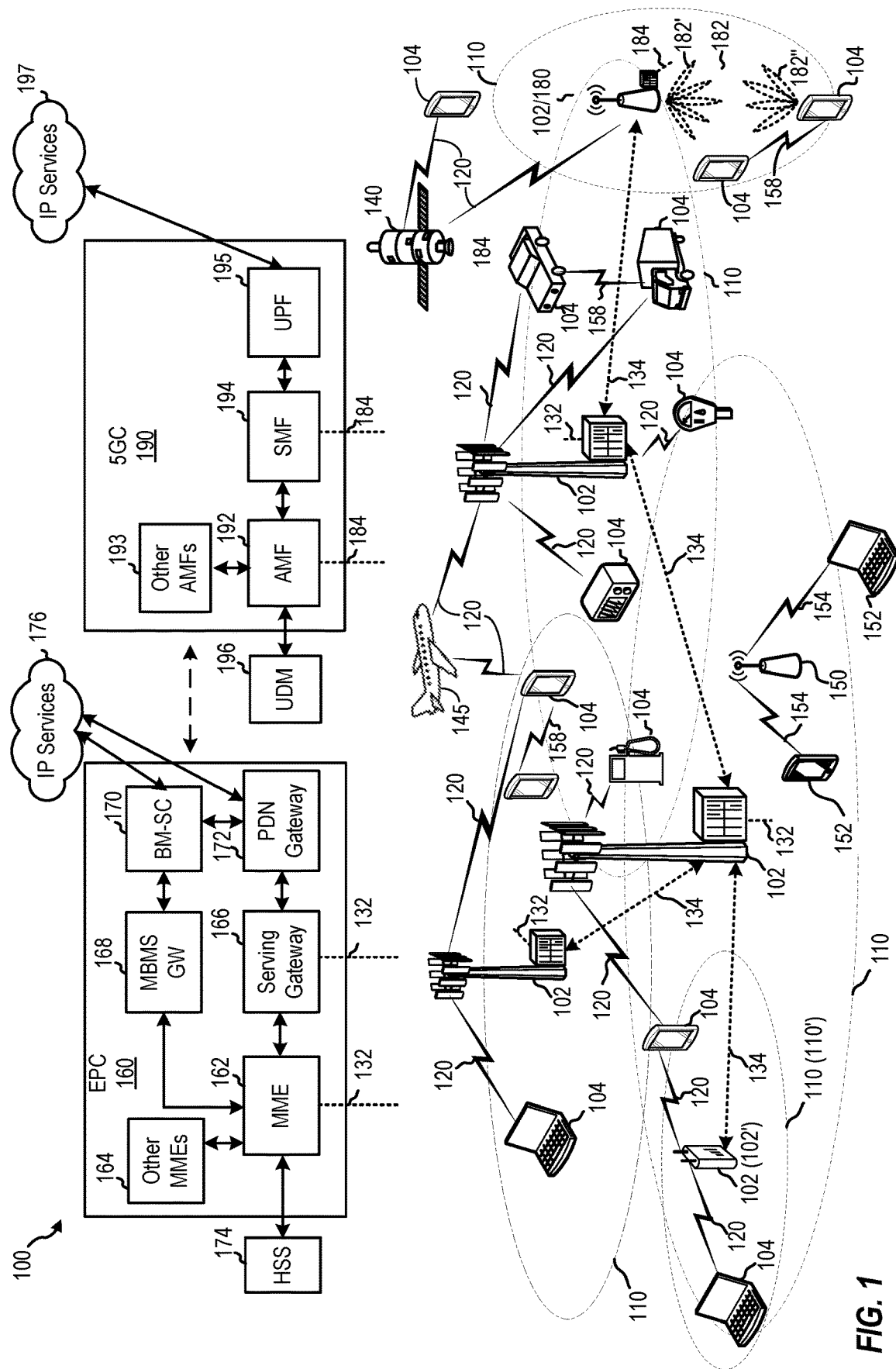
FIG. 1 depicts an example wireless communications network.

Aspects of the present disclosure provide apparatuses, methods, processing systems, and computer-readable mediums for slot preconfiguration for coverage enhancement and power saving.

One challenge in current wireless systems (e.g., 5G-NR) is reducing the power consumption of a user equipment (UE). This challenge is expected to become more prominent with increased bandwidth, as supporting higher bandwidth signals and higher data rates will significantly increase the power consumption. The power consumption includes not only the power consumed by the antenna elements themselves, but by various types of processing by different components, such as the analog-to-digital converters (ADCs), Digital-Front-End (DFE), and the digital baseband processors. In some cases, these power consumers can be dynamically reconfigured (e.g., by a base station) according to bandwidth (BW) and BW Group (BWG) configurations. Reconfiguration may help avoid the case where downlink (DL) channels do not fill the BW or BWG, which would result in a large amount of power consumption to support the unnecessarily large BW.

Physical downlink control channel (PDCCH) processing also plays a significant role in the UE power consumption, especially in certain cases where timing and frequency tracking may be challenging. For example, at the cell edge UEs may experience high symbol timing offset (STO) and carrier frequency offset (CFO) residuals from synchronization signal block (SSB) and tracking reference signal (TRS) based estimation. These residuals may cause inter symbol interference (ISI) and inter carrier interference (ICI). This may be addressed, but at the cost of increased UE complexity to process increased downlink control information (DCI) CFO and STO search space.

To maintain timing and frequency tracking, estimators are used to estimate STO and CFO based on synchronization signals, such as SSBs and TRS. Unfortunately, UE slots that are far in time (e.g., in terms of slot index) from slots that carry the SSB\TRS on which the estimation is based, will experience an increase in the estimator's (CFO and STO) errors according to the UE and gNB clock accuracy.

Aspects of the present disclosure, however, may help account for this decrease in estimator accuracy by providing a pre-determined slot configuration for slots that are far in time (from SSB\TRS). The pre-determined slot configuration may indicate to the UE the slot parameters, such as BW size and DCI search space.

The pre-determined slot configuration may have certain advantages, such as increased cell edge coverage and reduced UE power consumption. The increased cell edge coverage may be achieved, for example, by reducing the BW size and\or the DCI search space, which may enable the UE to better focus search resources and improve the PDCCH decoding probability. Once the PDCCH is decoded, the UE can update its estimators according to the PDCCH DMRS for the PDSCH part.

Reduced UE power consumption may be achieved because the UE may know what the BWG is after preconfigured number of slots and may reconfigure its DFE\digital components accordingly. In connected mode, the UE can reduce its power consumption dramatically (almost linear with the BW ratio change.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT)

Figure 2:
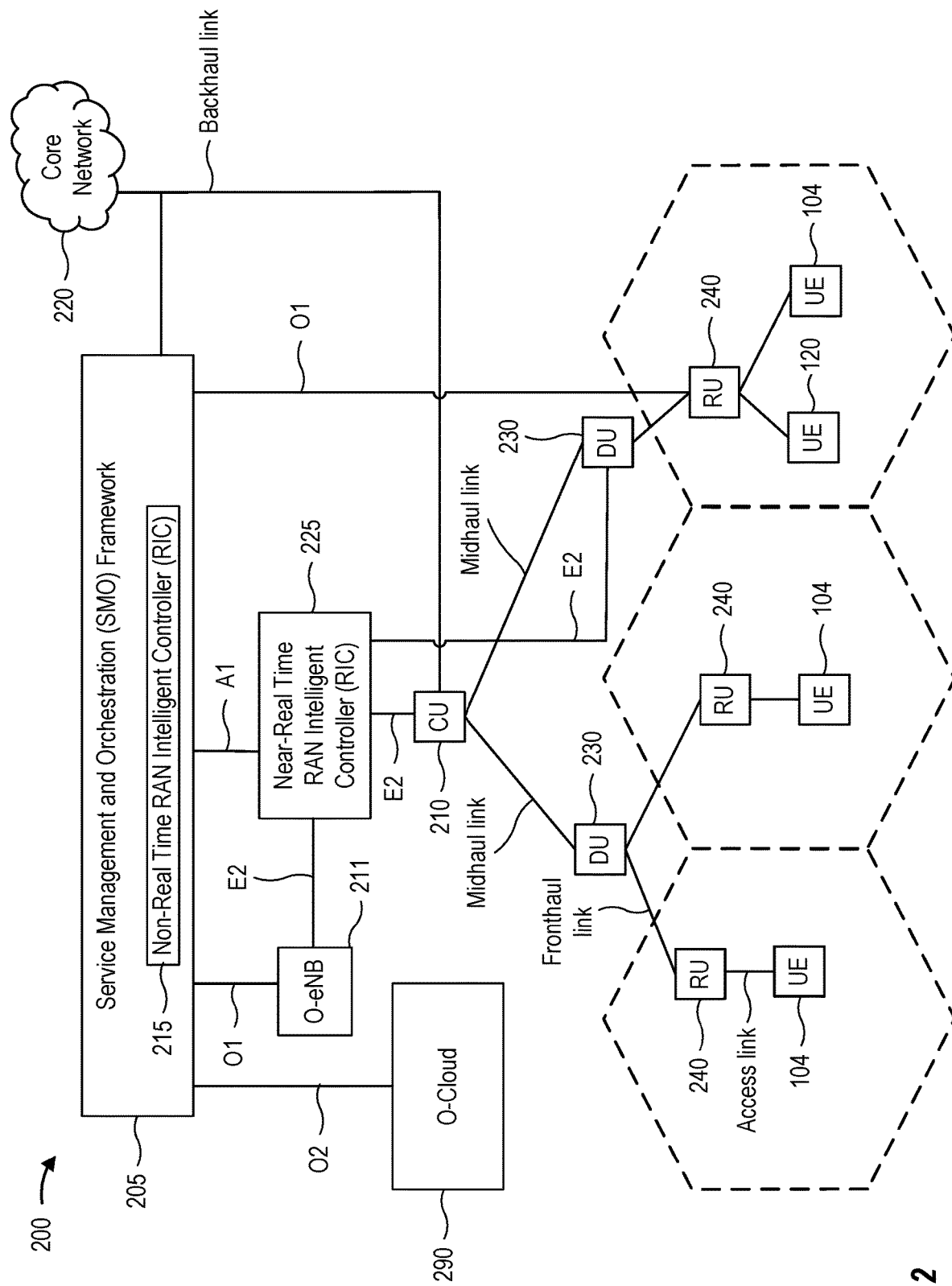
FIG. 2 depicts an example disaggregated base station architecture.

RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3r d Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
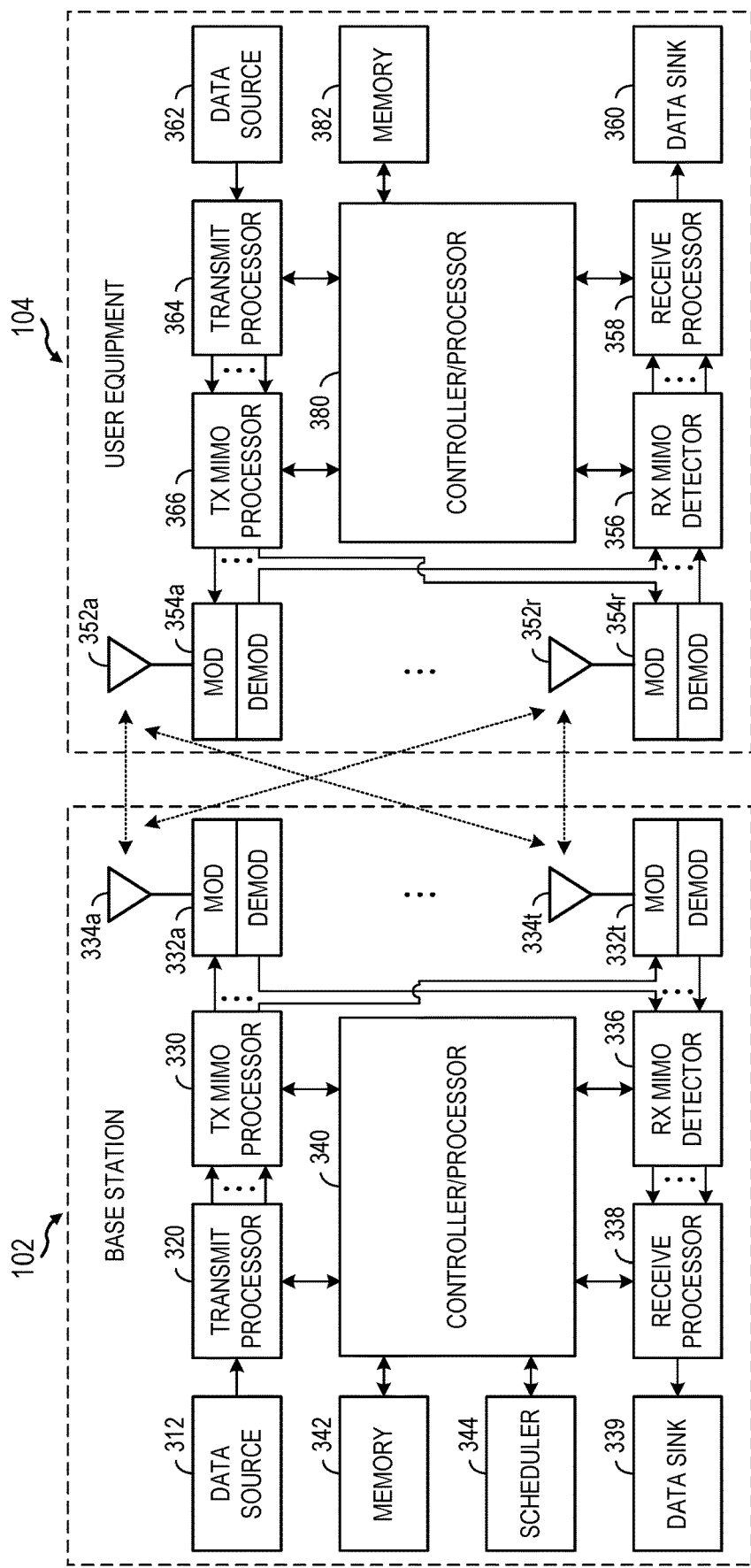
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Slot Preconfiguration for Coverage Enhancement and Power Saving Aspects of the present disclosure provide apparatuses, methods, processing systems, and computer-readable mediums for slot preconfiguration for coverage enhancement and power saving. Slot preconfiguration generally refers to configuring the UE with a different set of slot parameters to be applied at a predetermined time (e.g., in slots that are far away in time from slots that carry reference signals used to update estimators). The slot preconfiguration may help mitigate the impact of the potential for reduced estimator performance described above.

The preconfigured slot parameters proposed herein may help account for the dependency between the expected accumulated residual time drift for different SSB periodicities and UE SNR. In general, UEs with different SNR conditions may require a different SSB periodicity in order to avoid time drift accumulation above the critical level or may require a higher number of hypothesis in the DCI search space. Aspects of the present disclosure may anticipate this and may also account for residual error of the CFO correction outcome from the time difference of the estimated time (the SSB slot) and the corrected time (the PDSCH slot).

Figure 5:
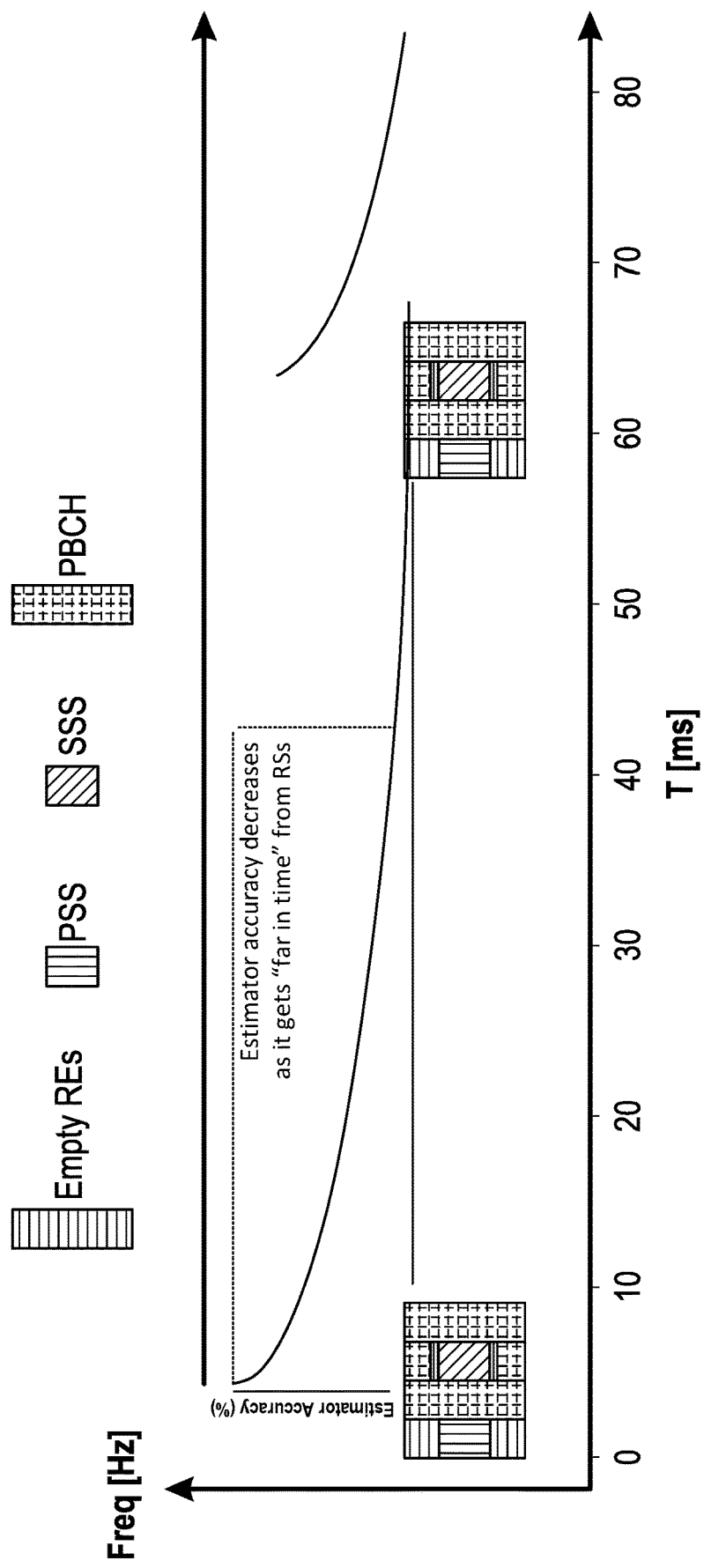
FIG. 5 depicts a graph illustrating estimator accuracy in a conventional solution.

As illustrated in FIG. 5, estimator accuracy is highest in the slots that carry the reference signals (e.g., SSBs and/or TRS) on which estimation is based. Estimator accuracy decreases significantly in UE slots that are far in time (e.g., in terms of slot index) from slots that carry the reference signals, resulting in an increase in the estimator's (CFO and STO) errors according to the UE and gNB clock accuracy.

This drop in accuracy will impact ability of the UE to successfully decode PDDCH, which can also play a significant role in the UE power consumption. This impact may be especially pronounced for UEs at the cell edge, that will experience a high STO and CFO residuals which will cause an ISI and ICI.

The slot preconfiguration proposed herein, however, may take into consideration the reduced estimator accuracy and adapt slot parameters accordingly. For example, the predetermined slot configuration may indicate to the UE the slot parameters, such as BW size and DCI search space that help a UE increase decoding performance when experiencing reduced estimator accuracy. The preconfigured slot parameters may help increase cell edge coverage.

Figure 9:
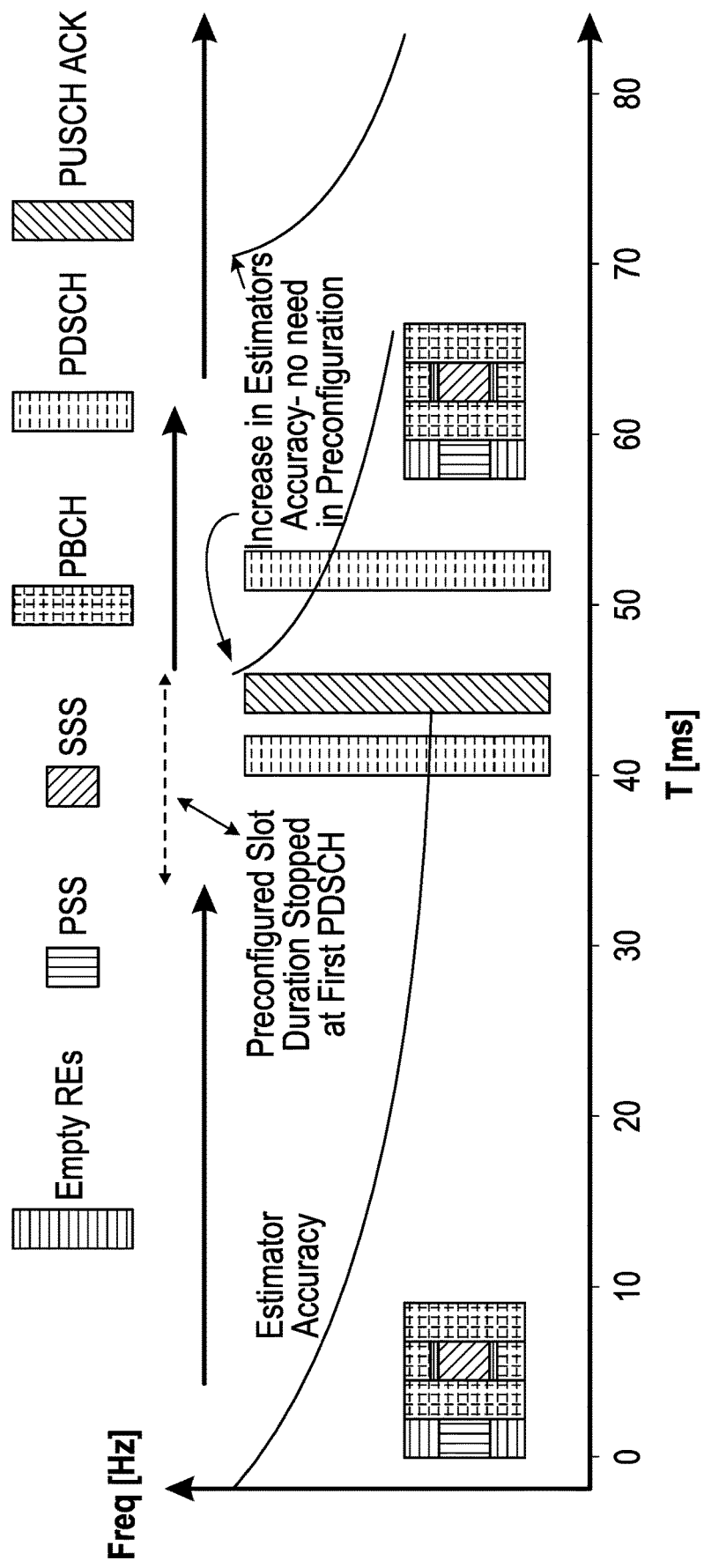
FIG. 9 depicts a graph illustrating an example of slot preconfiguration, in accordance with aspects of the present disclosure.

For example, reducing the BW size and\or the DCI search space may enable the UE to direct is search space resources to more focused searches that may improve the PDCCH decoding probability. Further, once a PDCCH is successfully decoded (as illustrated in FIG. 9), the UE can update its estimators according to the PDCCH DMRS for the PDSCH part.

Reducing the BW size and\or the DCI search space may also reduce UE power consumption. The UE will know what the bandwidth group (BWG) is after the preconfigured number of slots and can reconfigure its DFE\digital components accordingly. In connected mode, this may result in significant reductions in power consumption (e.g., almost linear with the BW ratio change).

Figure 6:
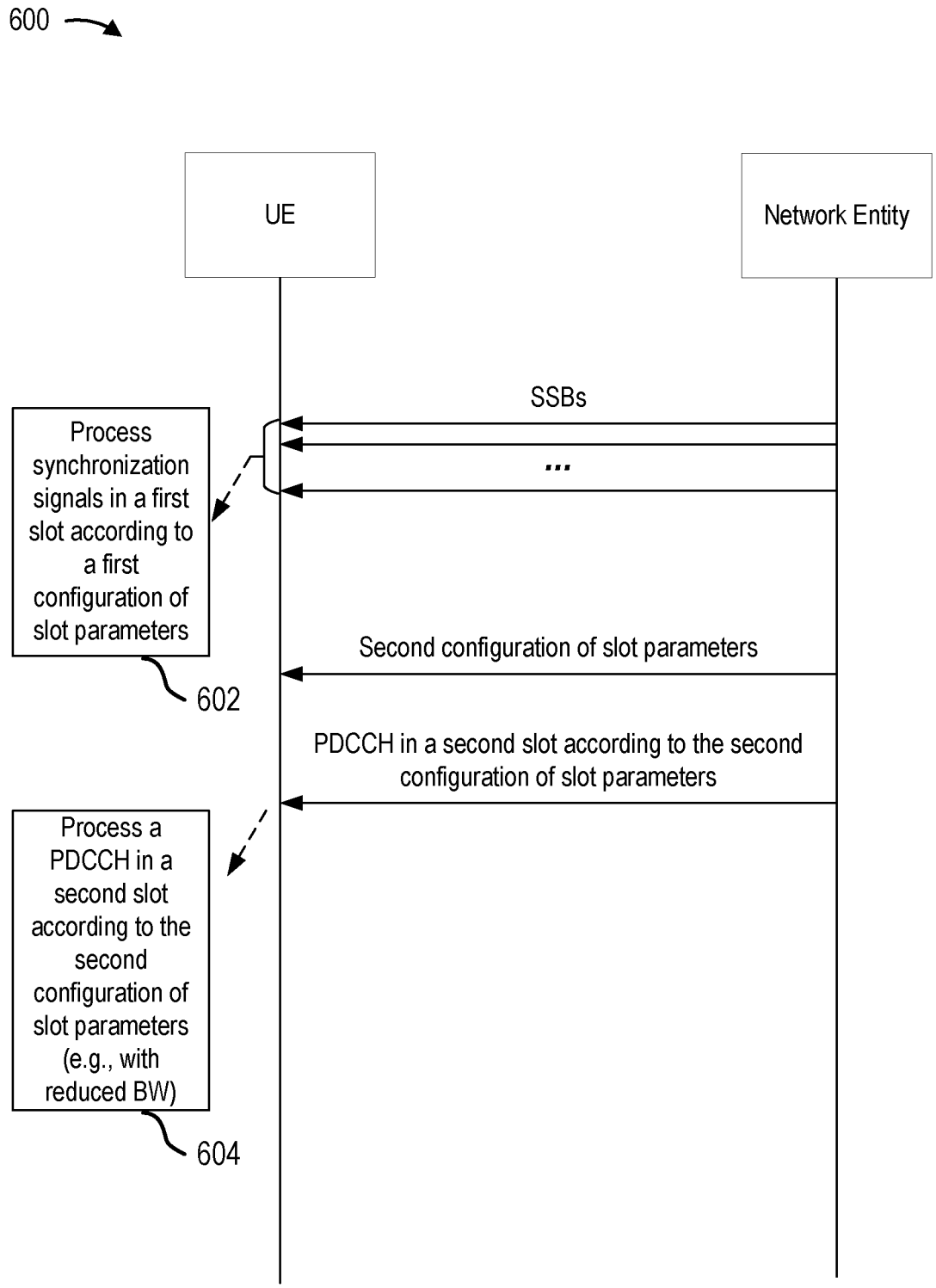
FIG. 6 depicts a call flow diagram for slot preconfiguration, in accordance with aspects of the present disclosure.

Slot preconfiguration proposed herein may be understood with reference to the call flow diagram 600 of FIG. 6, which shows example signaling between a UE and network entity. The UE may be an example of one of the UEs 104 illustrated in FIG. 1 or FIG. 3. The network entity may be an example of a base station 102 illustrated in FIG. 1 or FIG. 3 or a node of a disaggregated base station, as illustrated in FIG. 2

As shown at 602, the UE may process one or more synchronization signals in a first slot according to a first configuration of slot parameters. For example, the synchronization signals (e.g., SSBs and/or TRSs) may be used (to update estimators used) for time tracking, frequency tracking, or both.

The UE may receive a second configuration of slot parameters from the network entity. As shown at 604, the UE may then process a physical downlink control channel (PDCCH) in a second slot according to the second configuration of slot parameters, wherein the second slot occurs within a configured slot duration that is offset in time from the first slot.

Figure 7:
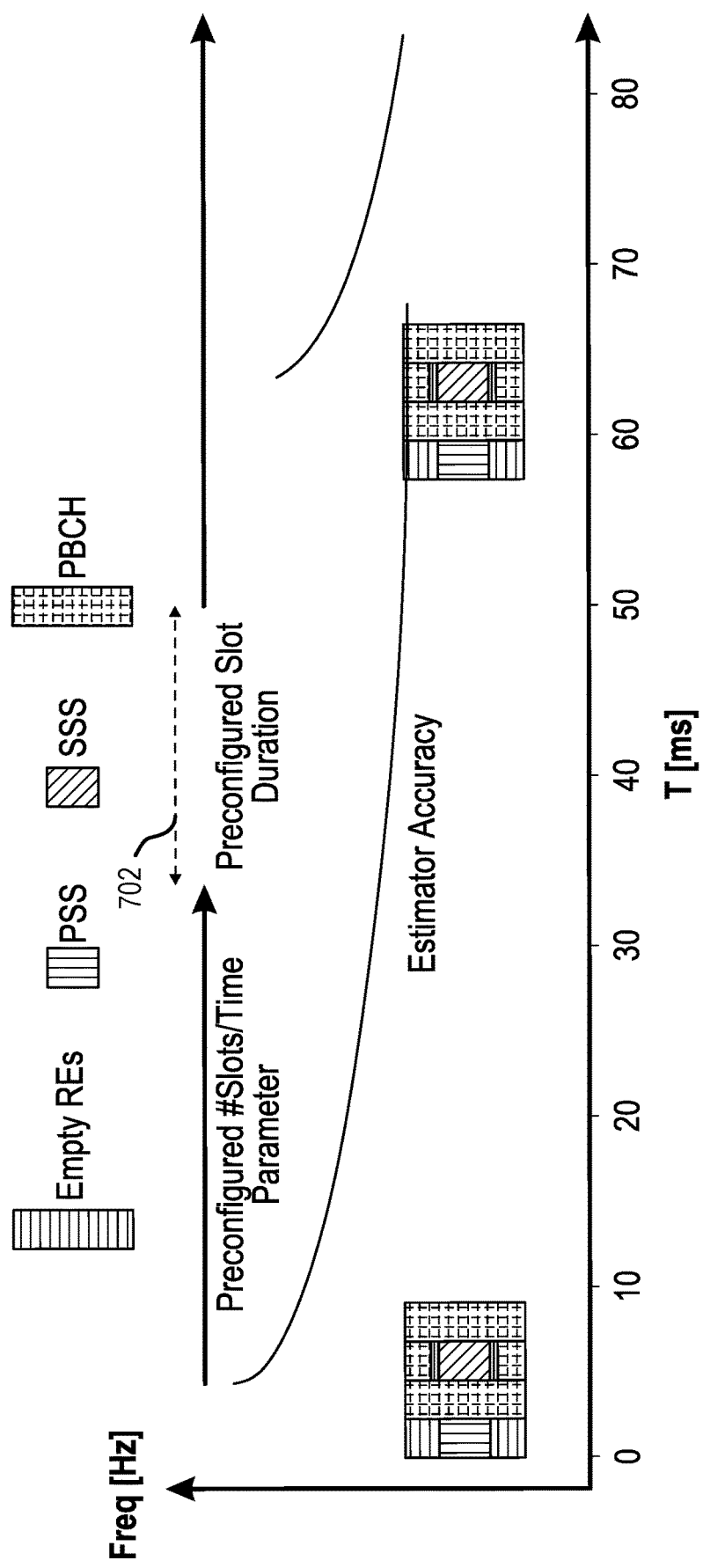
FIG. 7 depicts a graph illustrating an example of slot preconfiguration, in accordance with aspects of the present disclosure.

FIG. 7 illustrates how the second configuration of slot parameters (a slot preconfiguration) may be applied to a preconfigured slot duration 702. As shown, the preconfigured slot duration may span a number of slots and may be located far away in time from slots in which reference signals are conveyed. As shown, the preconfigured slot duration may start at a time when estimator accuracy has declined significantly relative to the high point after estimators are updated.

In cases, the UE will get a preconfigured slot with lower BW to reduce the DCI search space and by that improve the DCI detection probability.

Figure 8:
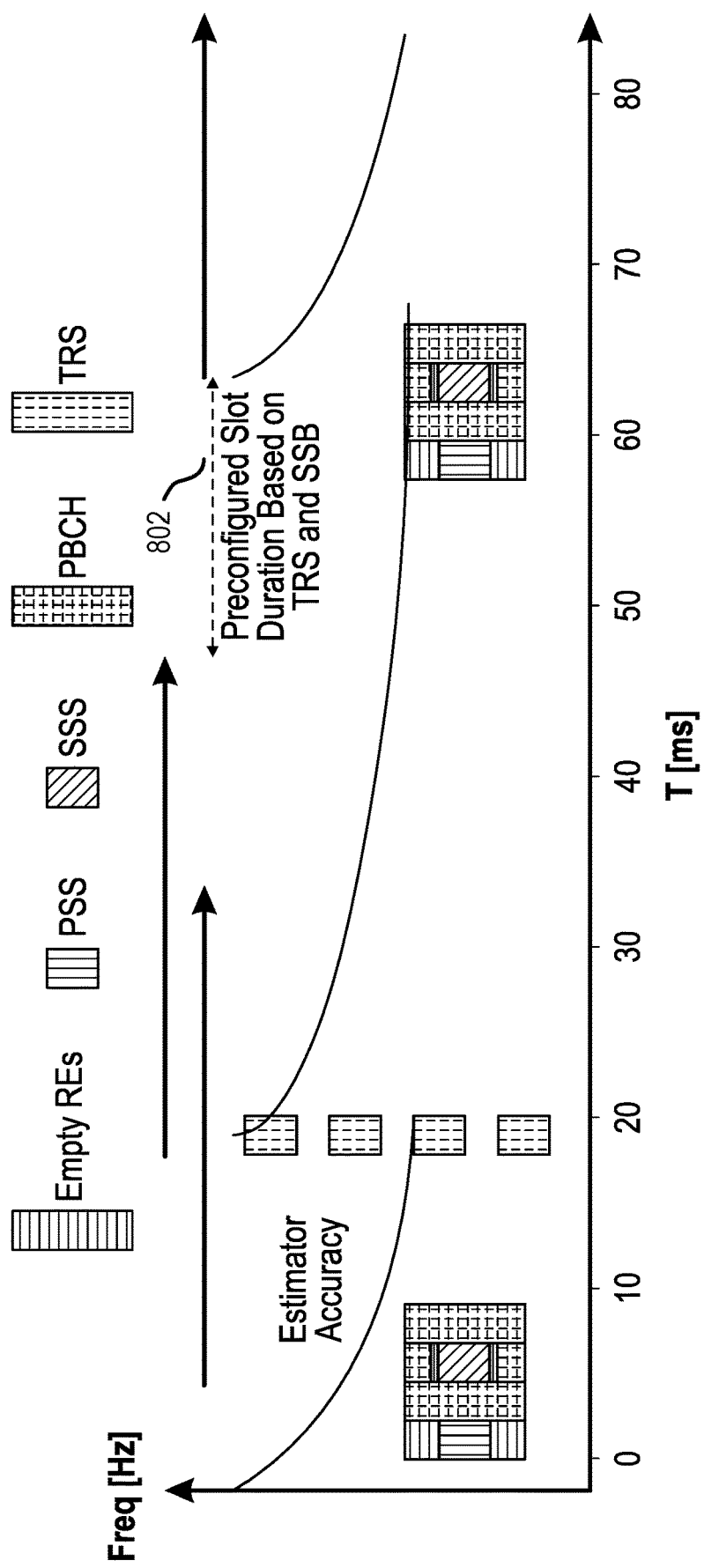
FIG. 8 depicts a graph illustrating an example of slot preconfiguration, in accordance with aspects of the present disclosure.

As illustrated in FIG. 8, in some cases, the preconfigured slot duration 802 may be determined relative to SSB and/or TRS slot location. In the illustrated example, since slots with TRS occur after SSBs, estimator accuracy may be restored and the preconfigured slot duration may be located further away in time from the SSBs relative to the preconfigured slot duration 702 of FIG. 7.

As illustrated in FIG. 9, in some cases, the preconfigured slot duration may terminate based on (successful decoding of) a first physical downlink shared channel (PDSCH). In other words, as illustrated, the UE may update estimators based on DMRS for the PDSCH, meaning reduced BW may no longer be needed and the (original) slot configuration may be restored early.

The slot preconfiguration may be conveyed in various manners. For example, in some cases, at connection establishment, a gNB may indicate to the UE the desired slot configuration for slots that are far in time from SSB/TRS slots. In some cases, the configuration may indicate the slot duration (e.g., the number of slots\time that the predefined configuration applies).

In some cases, the preconfiguration may be applied per channel (for example, SSB, TRS, etc.) and each channel may have a different slot duration (and/or offset in time). For example, each channel can have a different number of slots\time value according to its expected channel processing gain. Each time that one of those channels occur, a timer (or slot counter) to the "far" slots may be initiated.

As an example, if SSB is transmitted in slots 0, 60, 120, . . . . The slot duration for the far in time slots may be configured to be 30 slots. Thus, the preconfigured slot parameters may be applied on slots 31-60, 91-120, etc.

For the preconfigured slot duration, the BWG size (the total BW) can be the same as the regular (closer in time) slots or may be smaller to reduce the UE power consumption. In some cases, the UE may report its ability to reduce power consumption and the supported BW sizes. In case the UE is not capable of supporting the decrease in the BW size, this configuration can be discarded and the gNB may configure only the reduced DCI search space.

In some cases, the preconfigured slot parameters may indicate the control resource set (CORESET), which generally defines the search space that the DCI can be located. In general, the search space size may match the BWG size. In some cases, the UE may report a vector that indicates the supported (increased) number of (PDCCH candidate) hypotheses the UE can support.

In some cases, the preconfigured slot parameters may indicate a DCI aggregation level. For example, higher values of DCI aggregation level may be configured in the case of far in time slots. This may decrease the UE search space. For example, far slots may be configured with only DCI aggregation levels 4 and 8, which will limit the decoding candidates evaluated on the UE side.

In some cases, in order to reduce UE power, the UE may enter a low power state (go to sleep) during the slot duration indicated in the preconfigured slot parameters. In other words, given the reduced accuracy of estimators in this slot, a UE, according to a gNB configuration, may decide to enter the low power state rather than attempt to decode DCI.

In general, the configuration for far in time slots may indicate the slot duration location (e.g., as an offset from slots carrying SSBs/TRS) and number of slots. Given this general configuration, the UE may act accordingly. For example, the UE may attempt to decode DCI with the different parameters configured for these slots or may choose to go to sleep during this period and reduce UE power.

The slot preconfiguration may be signaled in various manners. For example, in some cases, the slot preconfiguration can be carried via RRC messages. In some cases, different preconfigurations (different sets of slot parameters) may be configured via RRC signaling and one or more of the preconfigurations may be selected (e.g., via a MAC CE).

As noted above, a UE may be able to update its estimators based on a last received PDSCH slot (if the cyclic redundancy check (CRC) passed). The UE may indicated this capability, if supported. In this case, the (pre)configuration of the far in time slots may be initiated from the end of the physical uplink shared channel (PUSCH) acknowledgment (ACK) transmission (e.g., plus a number of slots for Back Off).

In some cases, the network (e.g., via a gNB) may update the preconfigured parameters with RRC or MAC-CE signaling. In some cases, a UE may signal to the network (gNB) that the UE does not require different slot parameters (e.g., with lower BW\DCI search space) due to good estimators in the configured SSB periodicity.

Example Operations of a User Equipment

Figure 10:
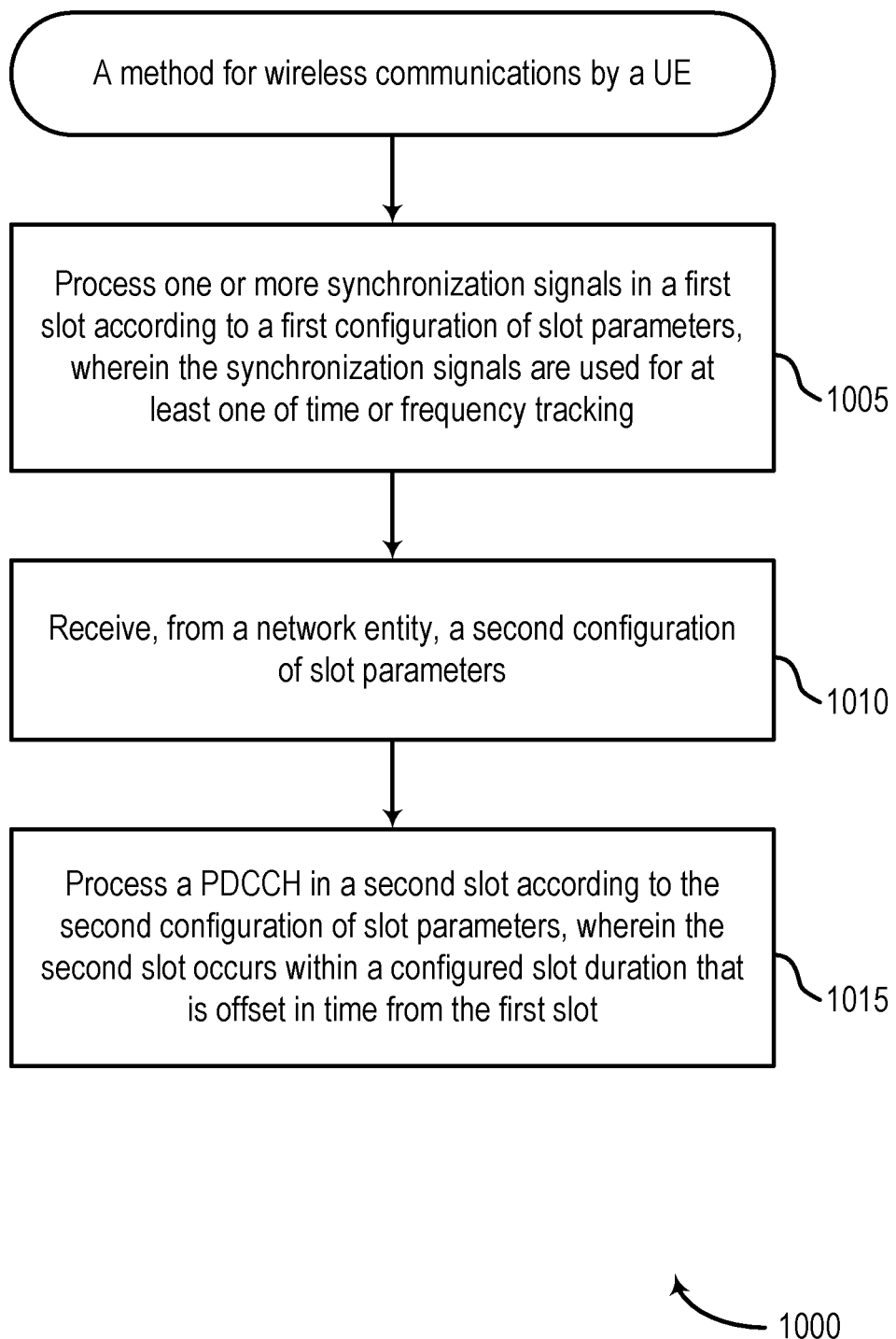
FIG. 10 depicts a method for wireless communications.

FIG. 10 shows an example of a method 1000 for wireless communications by a UE, such as a UE 104 of FIGS. 1 and 3.

Method 1000 begins at step 1005 with processing one or more synchronization signals in a first slot according to a first configuration of slot parameters, wherein the synchronization signals are used for at least one of time or frequency tracking. In some cases, the operations of this step refer to, or may be performed by, circuitry for processing and/or code for processing as described with reference to FIG. 12.

Method 1000 then proceeds to step 1010 with receiving, from a network entity, a second configuration of slot parameters. In some cases, the operations of this step refer to, or may be performed by, circuitry for receiving and/or code for receiving as described with reference to FIG. 12.

Method 1000 then proceeds to step 1015 with processing a PDCCH in a second slot according to the second configuration of slot parameters, wherein the second slot occurs within a configured slot duration that is offset in time from the first slot. In some cases, the operations of this step refer to, or may be performed by, circuitry for processing and/or code for processing as described with reference to FIG. 12.

In some aspects, the second configuration of slot parameters indicates at least one of: a location and number of slots in the configured slot duration, a BWG size, a search space, associated with the PDCCH, the search space having a size corresponding to the BWG size, or a sleep mode configuration of the UE.

In some aspects, the second configuration of slot parameters indicates different location and numbers of slots for different channel types.

In some aspects, the different channel types comprise at least one of a SSB or a TRS.

In some aspects, the second configuration of slot parameters indicates a BWG size that is smaller than a BWG size associated with the first slot.

In some aspects, the method 1000 further includes determining that the UE is not capable of supporting the BWG size. In some cases, the operations of this step refer to, or may be performed by, circuitry for determining and/or code for determining as described with reference to FIG. 12.

In some aspects, the method 1000 further includes discarding the BWG size based on the determination. In some cases, the operations of this step refer to, or may be performed by, circuitry for discarding and/or code for discarding as described with reference to FIG. 12.

In some aspects, the method 1000 further includes transmitting, to the network entity, capability information indicating an ability of the UE to at least one of reduce power consumption or support the BWG size. In some cases, the operations of this step refer to, or may be performed by, circuitry for transmitting and/or code for transmitting as described with reference to FIG. 12.

In some aspects, the second configuration of slot parameters is received via RRC signaling.

In some aspects, the method 1000 further includes receiving signaling, from the network entity, updating the second configuration of slot parameters. In some cases, the operations of this step refer to, or may be performed by, circuitry for receiving and/or code for receiving as described with reference to FIG. 12.

In some aspects, the signaling is received via at least one of RRC signaling or MAC-CE signaling.

In some aspects, the method 1000 further includes indicating a capability of the UE to support updating one or more estimators configured to perform the at least one of time or frequency tracking. In some cases, the operations of this step refer to, or may be performed by, circuitry for indicating and/or code for indicating as described with reference to FIG. 12.

In some aspects, the method 1000 further includes updating one or more estimators. In some cases, the operations of this step refer to, or may be performed by, circuitry for updating and/or code for updating as described with reference to FIG. 12.

In some aspects, the one or more estimators comprise one or more of CFO estimators and STO estimators.

In some aspects, updating the one or more estimators is based on a last received PDSCH slot.

In some aspects, the second configuration of slot parameters is applied an offset time after a PUSCH ACK transmission.

In some aspects, the method 1000 further includes signaling, to the network entity, whether the UE requests the second configuration of slot parameters. In some cases, the operations of this step refer to, or may be performed by, circuitry for signaling and/or code for signaling as described with reference to FIG. 12.

Figure 12:
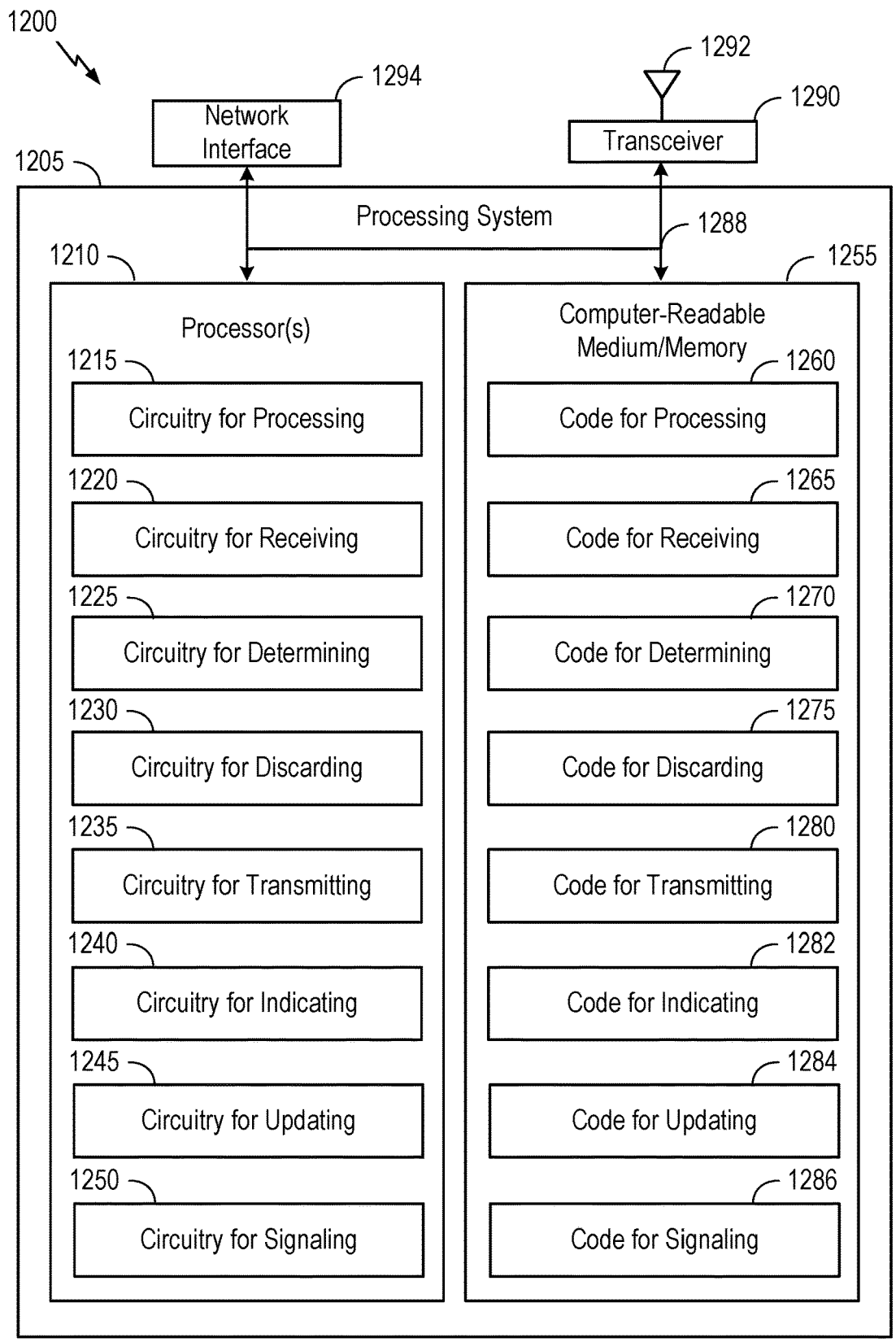
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Operations of a Network Entity

Figure 11:
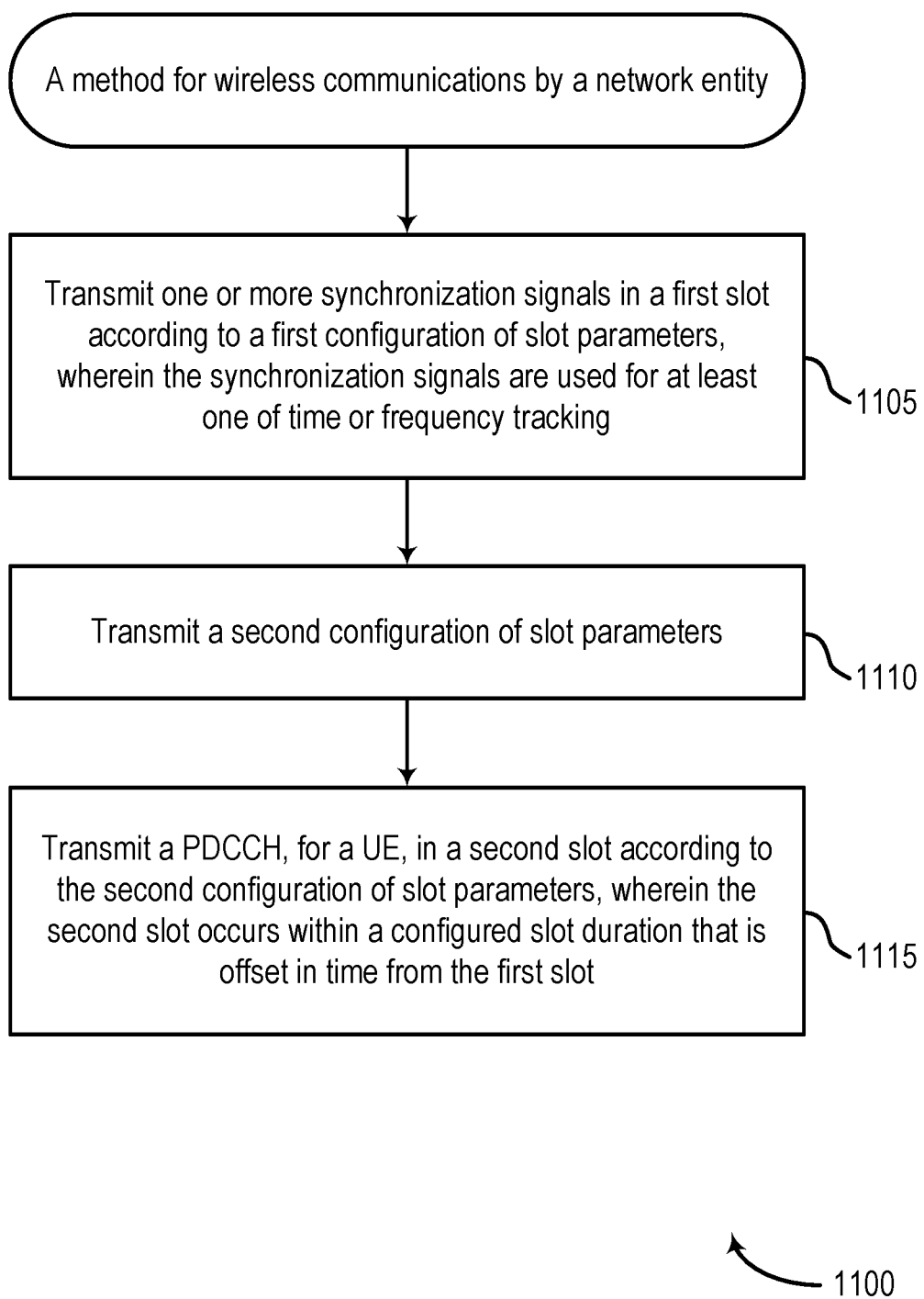
FIG. 11 depicts a method for wireless communications.

FIG. 11 shows an example of a method 1100 for wireless communications by a network entity, such as a BS 102 of FIGS. 1 and 3, or a disaggregated base station as discussed with respect to FIG. 2.

Method 1100 begins at step 1105 with transmitting one or more synchronization signals in a first slot according to a first configuration of slot parameters, wherein the synchronization signals are used for at least one of time or frequency tracking. In some cases, the operations of this step refer to, or may be performed by, circuitry for transmitting and/or code for transmitting as described with reference to FIG. 12.

Method 1100 then proceeds to step 1110 with transmitting a second configuration of slot parameters. In some cases, the operations of this step refer to, or may be performed by, circuitry for transmitting and/or code for transmitting as described with reference to FIG. 12.

Method 1100 then proceeds to step 1115 with transmitting a PDCCH, for a UE, in a second slot according to the second configuration of slot parameters, wherein the second slot occurs within a configured slot duration that is offset in time from the first slot. In some cases, the operations of this step refer to, or may be performed by, circuitry for transmitting and/or code for transmitting as described with reference to FIG. 12.

In some aspects, the second configuration of slot parameters indicates at least one of: a location and number of slots in the configured slot duration, a BWG size, a search space, associated with the PDCCH, the search space having a size corresponding to the BWG size, or a sleep mode configuration of the UE.

In some aspects, the second configuration of slot parameters indicates different location and numbers of slots for different channel types.

In some aspects, the different channel types comprise at least one of a SSB or a TRS.

In some aspects, the second configuration of slot parameters indicates a BWG size that is smaller than a BWG size associated with the first slot.

In some aspects, the method 1100 further includes receiving capability information indicating an ability of the UE to at least one of reduce power consumption or support the BWG size. In some cases, the operations of this step refer to, or may be performed by, circuitry for receiving and/or code for receiving as described with reference to FIG. 12.

In some aspects, the second configuration of slot parameters is transmitted via RRC signaling.

In some aspects, the method 1100 further includes transmitting signaling updating the second configuration of slot parameters. In some cases, the operations of this step refer to, or may be performed by, circuitry for transmitting and/or code for transmitting as described with reference to FIG. 12.

In some aspects, the signaling is transmitted via at least one of RRC signaling or MAC-CE signaling.

In some aspects, the method 1100 further includes receiving an indication of a capability of the UE to support updating one or more estimators configured to perform the at least one of time or frequency tracking. In some cases, the operations of this step refer to, or may be performed by, circuitry for receiving and/or code for receiving as described with reference to FIG. 12.

In some aspects, the one or more estimators comprise one or more of CFO estimators and STO estimators.

In some aspects, the second configuration of slot parameters is applied an offset time after a PUSCH ACK transmission.

In some aspects, the method 1100 further includes receiving signaling indicating whether the UE requests the second configuration of slot parameters. In some cases, the operations of this step refer to, or may be performed by, circuitry for receiving and/or code for receiving as described with reference to FIG. 12.

In one aspect, method 1100, or any aspect related to it, may be performed by an apparatus, such as communications device 1200 of FIG. 12, which includes various components operable, configured, or adapted to perform the method 1100. Communications device 1200 is described below in further detail.

Note that FIG. 11 is just one example of a method, and other methods including fewer, additional, or alternative steps are possible consistent with this disclosure.

Example Communications Device

FIG. 12 depicts aspects of an example communications device 1200. In some aspects, communications device 1200 is a user equipment, such as UE 104 described above with respect to FIGS. 1 and 3. In some aspects, communications device 1200 is a network entity, such as BS 102 of FIGS. 1 and 3, or a disaggregated base station as discussed with respect to FIG. 2.

The communications device 1200 includes a processing system 1205 coupled to the transceiver 1290 (e.g., a transmitter and/or a receiver). In some aspects (e.g., when communications device 1200 is a network entity), processing system 1205 may be coupled to a network interface 1294 that is configured to obtain and send signals for the communications device 1200 via communication link(s), such as a backhaul link, midhaul link, and/or fronthaul link as described herein, such as with respect to FIG. 2. The transceiver 1290 is configured to transmit and receive signals for the communications device 1200 via the antenna 1292, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1255 via a bus 1288. In certain aspects, the computer-readable medium/memory 1255 is configured to store instructions (e.g., computer-executable code) that when executed by the one or more processors 1210, cause the one or more processors 1210 to perform: the method 1000 described with respect to FIG. 10, or any aspect related to it; and/or the method 1100 described with respect to FIG. 11, or any aspect related to it. Note that reference to a processor performing a function of communications device 1200 may include one or more processors 1210 performing that function of communications device 1200.

In the depicted example, computer-readable medium/memory 1255 stores code (e.g., executable instructions), such as code for processing 1260, code for receiving 1265, code for determining 1270, code for discarding 1275, code for transmitting 1280, code for indicating 1282, code for updating 1284, and code for signaling 1286. Processing of the code for processing 1260, code for receiving 1265, code for determining 1270, code for discarding 1275, code for transmitting 1280, code for indicating 1282, code for updating 1284, and code for signaling 1286 may cause the communications device 1200 to perform: the method 1000 described with respect to FIG. 10, or any aspect related to it; and/or the method 1100 described with respect to FIG. 11, or any aspect related to it.

The one or more processors 1210 include circuitry configured to implement (e.g., execute) the code stored in the computer-readable medium/memory 1255, including circuitry such as circuitry for processing 1215, circuitry for receiving 1220, circuitry for determining 1225, circuitry for discarding 1230, circuitry for transmitting 1235, circuitry for indicating 1240, circuitry for updating 1245, and circuitry for signaling 1250. Processing with circuitry for processing 1215, circuitry for receiving 1220, circuitry for determining 1225, circuitry for discarding 1230, circuitry for transmitting 1235, circuitry for indicating 1240, circuitry for updating 1245, and circuitry for signaling 1250 may cause the communications device 1200 to perform: the method 1000 described with respect to FIG. 10, or any aspect related to it; and/or the method 1100 described with respect to FIG. 11, or any aspect related to it.

Various components of the communications device 1200 may provide means for performing: the method 1000 described with respect to FIG. 10, or any aspect related to it; and/or the method 1100 described with respect to FIG. 11, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1290 and the antenna 1292 of the communications device 1200 in FIG. 12. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1290 and the antenna 1292 of the communications device 1200 in FIG. 12.

Example Clauses

Implementation examples are described in the following numbered clauses:

Clause 1: A method for wireless communications by a UE, comprising: processing one or more synchronization signals in a first slot according to a first configuration of slot parameters, wherein the synchronization signals are used for at least one of time or frequency tracking; receiving, from a network entity, a second configuration of slot parameters; and processing a PDCCH in a second slot according to the second configuration of slot parameters, wherein the second slot occurs within a configured slot duration that is offset in time from the first slot.

Clause 2: The method of Clause 1, wherein the second configuration of slot parameters indicates at least one of: a location and number of slots in the configured slot duration, a BWG size, a search space, associated with the PDCCH, the search space having a size corresponding to the BWG size, or a sleep mode configuration of the UE.

Clause 3: The method of Clause 2, wherein the second configuration of slot parameters indicates different location and numbers of slots for different channel types.

Clause 4: The method of Clause 3, wherein the different channel types comprise at least one of a SSB or a TRS.

Clause 5: The method of Clause 2, wherein the second configuration of slot parameters indicates a BWG size that is smaller than a BWG size associated with the first slot.

Clause 6: The method of Clause 2, further comprising: determining that the UE is not capable of supporting the BWG size; and discarding the BWG size based on the determination.

Clause 7: The method of Clause 2, further comprising: transmitting, to the network entity, capability information indicating an ability of the UE to at least one of reduce power consumption or support the BWG size.

Clause 8: The method of any one of Clauses 1-7, wherein the second configuration of slot parameters is received via RRC signaling.

Clause 9: The method of any one of Clauses 1-8, further comprising: receiving signaling, from the network entity, updating the second configuration of slot parameters.

Clause 10: The method of Clause 9, wherein the signaling is received via at least one of RRC signaling or MAC-CE signaling.

Clause 11: The method of any one of Clauses 1-10, further comprising: indicating a capability of the UE to support updating one or more estimators configured to perform the at least one of time or frequency tracking; and updating one or more estimators.

Clause 12: The method of Clause 11, wherein the one or more estimators comprise one or more of CFO estimators and STO estimators.

Clause 13: The method of Clause 11, wherein updating the one or more estimators is based on a last received PDSCH slot.

Clause 14: The method of Clause 11, wherein the second configuration of slot parameters is applied an offset time after a PUSCH ACK transmission.

Clause 15: The method of any one of Clauses 1-14, further comprising: signaling, to the network entity, whether the UE requests the second configuration of slot parameters.

Clause 16: A method for wireless communications by a network entity, comprising: transmitting one or more synchronization signals in a first slot according to a first configuration of slot parameters, wherein the synchronization signals are used for at least one of time or frequency tracking; transmitting a second configuration of slot parameters; and transmitting a PDCCH, for a UE, in a second slot according to the second configuration of slot parameters, wherein the second slot occurs within a configured slot duration that is offset in time from the first slot.

Clause 17: The method of Clause 16, wherein the second configuration of slot parameters indicates at least one of: a location and number of slots in the configured slot duration, a BWG size, a search space, associated with the PDCCH, the search space having a size corresponding to the BWG size, or a sleep mode configuration of the UE.

Clause 18: The method of Clause 17, wherein the second configuration of slot parameters indicates different location and numbers of slots for different channel types.

Clause 19: The method of Clause 18, wherein the different channel types comprise at least one of a SSB or a TRS.

Clause 20: The method of Clause 17, wherein the second configuration of slot parameters indicates a BWG size that is smaller than a BWG size associated with the first slot.

Clause 21: The method of Clause 17, further comprising: receiving capability information indicating an ability of the UE to at least one of reduce power consumption or support the BWG size.

Clause 22: The method of any one of Clauses 16-21, wherein the second configuration of slot parameters is transmitted via RRC signaling.

Clause 23: The method of any one of Clauses 16-22, further comprising: transmitting signaling updating the second configuration of slot parameters.

Clause 24: The method of Clause 23, wherein the signaling is transmitted via at least one of RRC signaling or MAC-CE signaling.

Clause 25: The method of any one of Clauses 16-24, further comprising: receiving an indication of a capability of the UE to support updating one or more estimators configured to perform the at least one of time or frequency tracking.

Clause 26: The method of Clause 25, wherein the one or more estimators comprise one or more of CFO estimators and STO estimators.

Clause 27: The method of any one of Clauses 16-26, wherein the second configuration of slot parameters is applied an offset time after a PUSCH ACK transmission.

Clause 28: The method of any one of Clauses 16-27, further comprising: receiving signaling indicating whether the UE requests the second configuration of slot parameters.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
processing one or more synchronization signals in a first slot according to a first configuration of slot parameters, wherein the synchronization signals are used for at least one of time or frequency tracking;
receiving, from a network entity, a second configuration of slot parameters; and
processing a physical downlink control channel (PDCCH) in a second slot according to the second configuration of slot parameters, wherein the second slot occurs within a configured slot duration that is offset in time from the first slot.

2. The method of claim 1, wherein the second configuration of slot parameters indicates at least one of:
a location and number of slots in the configured slot duration,
a bandwidth group (BWG) size,
a search space, associated with the PDCCH, the search space having a size corresponding to the BWG size, or
a sleep mode configuration of the UE.

3. The method of claim 2, wherein the second configuration of slot parameters indicates different location and numbers of slots for different channel types.

4. The method of claim 3, wherein the different channel types comprise at least one of a synchronization signal block (SSB) or a tracking reference signal (TRS).

5. The method of claim 2, wherein the second configuration of slot parameters indicates a BWG size that is smaller than a BWG size associated with the first slot.

6. The method of claim 2, further comprising:
determining that the UE is not capable of supporting the BWG size; and
discarding the BWG size based on the determination.

7. The method of claim 2, further comprising transmitting, to the network entity, capability information indicating an ability of the UE to at least one of reduce power consumption or support the BWG size.

8. The method of claim 1, wherein the second configuration of slot parameters is received via radio resource control (RRC) signaling.

9. The method of claim 1, further comprising:
receiving signaling, from the network entity, updating the second configuration of slot parameters.

10. The method of claim 9, wherein the signaling is received via at least one of radio resource control (RRC) signaling or media access control (MAC) control element (MAC-CE) signaling.

11. The method of claim 1, further comprising:
indicating a capability of the UE to support updating one or more estimators configured to perform the at least one of time or frequency tracking; and
updating one or more estimators.

12. The method of claim 11, wherein the one or more estimators comprise one or more of carrier-frequency-offset (CFO) estimators and symbol-timing-offset (STO) estimators.

13. The method of claim 11, wherein updating the one or more estimators is based on a last received physical downlink shared channel (PDSCH) slot.

14. The method of claim 11, wherein the second configuration of slot parameters is applied an offset time after a physical uplink shared channel (PUSCH) acknowledgement (ACK) transmission.

15. The method of claim 1, further comprising signaling, to the network entity, whether the UE requests the second configuration of slot parameters.

16. A method for wireless communications by a network entity, comprising:
transmitting one or more synchronization signals in a first slot according to a first configuration of slot parameters, wherein the synchronization signals are used for at least one of time or frequency tracking;
transmitting a second configuration of slot parameters; and
transmitting a physical downlink control channel (PDCCH), for a user equipment (UE), in a second slot according to the second configuration of slot parameters, wherein the second slot occurs within a configured slot duration that is offset in time from the first slot.

17. The method of claim 16, wherein the second configuration of slot parameters indicates at least one of:
a location and number of slots in the configured slot duration,
a bandwidth group (BWG) size,
a search space, associated with the PDCCH, the search space having a size corresponding to the BWG size, or
a sleep mode configuration of the UE.

18. The method of claim 17, wherein the second configuration of slot parameters indicates different location and numbers of slots for different channel types.

19. The method of claim 18, wherein the different channel types comprise at least one of a synchronization signal block (SSB) or a tracking reference signal (TRS).

20. The method of claim 17, wherein the second configuration of slot parameters indicates a BWG size that is smaller than a BWG size associated with the first slot.

21. The method of claim 17, further comprising receiving capability information indicating an ability of the UE to at least one of reduce power consumption or support the BWG size.

22. The method of claim 16, wherein the second configuration of slot parameters is transmitted via radio resource control (RRC) signaling.

23. The method of claim 16, further comprising:
transmitting signaling updating the second configuration of slot parameters.

24. The method of claim 23, wherein the signaling is transmitted via at least one of radio resource control (RRC) signaling or media access control (MAC) control element (MAC-CE) signaling.

25. The method of claim 16, further comprising:
receiving an indication of a capability of the UE to support updating one or more estimators configured to perform the at least one of time or frequency tracking.

26. The method of claim 25, wherein the one or more estimators comprise one or more of carrier-frequency-offset (CFO) estimators and symbol-timing-offset (STO) estimators.

27. The method of claim 16, wherein the second configuration of slot parameters is applied an offset time after a physical uplink shared channel (PUSCH) acknowledgement (ACK) transmission.

28. The method of claim 16, further comprising receiving signaling indicating whether the UE requests the second configuration of slot parameters.

29. A user equipment (UE) configured for wireless communication, comprising: a memory comprising processor-executable instructions; and one or more processors configured to execute the processor-executable instructions and cause the UE to:
- process one or more synchronization signals in a first slot according to a first configuration of slot parameters, wherein the synchronization signals are used for at least one of time or frequency tracking;
- receive, from a network entity, a second configuration of slot parameters; and
- process a physical downlink control channel (PDCCH) in a second slot according to the second configuration of slot parameters, wherein the second slot occurs within a configured slot duration that is offset in time from the first slot.

30. A network entity configured for wireless communication, comprising: a memory comprising processor-executable instructions; and one or more processors configured to execute the processor-executable instructions and cause the network entity to:
- transmit one or more synchronization signals in a first slot according to a first configuration of slot parameters, wherein the synchronization signals are used for at least one of time or frequency tracking;
- transmit a second configuration of slot parameters; and
- transmit a physical downlink control channel (PDCCH), for a user equipment (UE), in a second slot according to the second configuration of slot parameters, wherein the second slot occurs within a configured slot duration that is offset in time from the first slot.

* * * * *